US011086392B1

(12) United States Patent
Sztuk et al.

(10) Patent No.: US 11,086,392 B1
(45) Date of Patent: Aug. 10, 2021

(54) DEVICES, SYSTEMS, AND METHODS FOR VIRTUAL REPRESENTATION OF USER INTERFACE DEVICES

(71) Applicant: Facebook Technologies, LLC, Menlo Park, CA (US)

(72) Inventors: Sebastian Sztuk, Menlo Park, CA (US); Omar John Pualuan, San Jose, CA (US); Jeffrey Witthuhn, Fremont, CA (US); Nabeel Farooq Butt, Union City, CA (US); Jonathan Ravasz, London (GB); Simon Tickner, Canterbury (GB); Robert Ellis, London (GB); Kayvon Asemani, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/379,103

(22) Filed: Apr. 9, 2019

(51) Int. Cl.
   *G06F 3/01* (2006.01)
   *G06F 3/14* (2006.01)
   *G06F 3/0487* (2013.01)

(52) U.S. Cl.
   CPC .......... *G06F 3/011* (2013.01); *G06F 3/0487* (2013.01); *G06F 3/1423* (2013.01)

(58) Field of Classification Search
   CPC ....... G06F 3/011; G06F 3/0487; G06F 3/1423
   See application file for complete search history.

(56) References Cited

U.S. PATENT DOCUMENTS

| 8,643,951 | B1* | 2/2014 | Wheeler | G02B 27/017 |
| | | | | 359/630 |
| 9,335,547 | B2* | 5/2016 | Takano | G06F 3/0482 |
| 9,767,613 | B1* | 9/2017 | Bedikian | G06F 3/147 |
| 10,181,219 | B1* | 1/2019 | Murphy | G06F 3/0416 |
| 10,386,938 | B2* | 8/2019 | Raja | G06F 3/011 |
| 10,521,009 | B2* | 12/2019 | Iyer | G06F 3/038 |
| 10,895,966 | B2* | 1/2021 | Pahud | G06F 3/011 |
| 2007/0243863 | A1* | 10/2007 | Hong | G06F 3/04842 |
| | | | | 455/418 |
| 2013/0002545 | A1* | 1/2013 | Heinrich | G06F 3/03547 |
| | | | | 345/157 |
| 2014/0160002 | A1* | 6/2014 | Dent | G06F 3/1431 |
| | | | | 345/156 |
| 2016/0171770 | A1* | 6/2016 | Pedrotti | G06F 3/012 |
| | | | | 345/633 |
| 2016/0232715 | A1* | 8/2016 | Lee | G06T 19/006 |
| 2016/0267712 | A1* | 9/2016 | Nartker | G06F 3/012 |
| 2016/0371886 | A1* | 12/2016 | Thompson | G06F 3/013 |
| 2017/0076502 | A1* | 3/2017 | Chen | G06F 1/1626 |
| 2017/0083276 | A1* | 3/2017 | Lee | G06F 3/011 |
| 2017/0336878 | A1* | 11/2017 | Iyer | G06F 3/0346 |
| 2018/0246328 | A1* | 8/2018 | Song | G02B 27/017 |
| 2018/0321737 | A1* | 11/2018 | Pahud | G06F 3/0346 |
| 2019/0347865 | A1* | 11/2019 | Hackett | G06F 30/00 |

* cited by examiner

Primary Examiner — Benyam Ketema
(74) Attorney, Agent, or Firm — FisherBroyles, LLP

(57) ABSTRACT

The disclosed computer-implemented method may include communicatively coupling a user interface device to a virtual reality device, capturing inputs from a user on the user interface device, displaying, on the virtual reality device, a virtual representation of the captured inputs from the user, and mirroring, on the virtual reality device, content presented on the user interface device. Various other methods, systems, and computer-readable media are also disclosed.

19 Claims, 14 Drawing Sheets

DEVICES, SYSTEMS, AND METHODS FOR VIRTUAL REPRESENTATION OF USER INTERFACE DEVICES

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
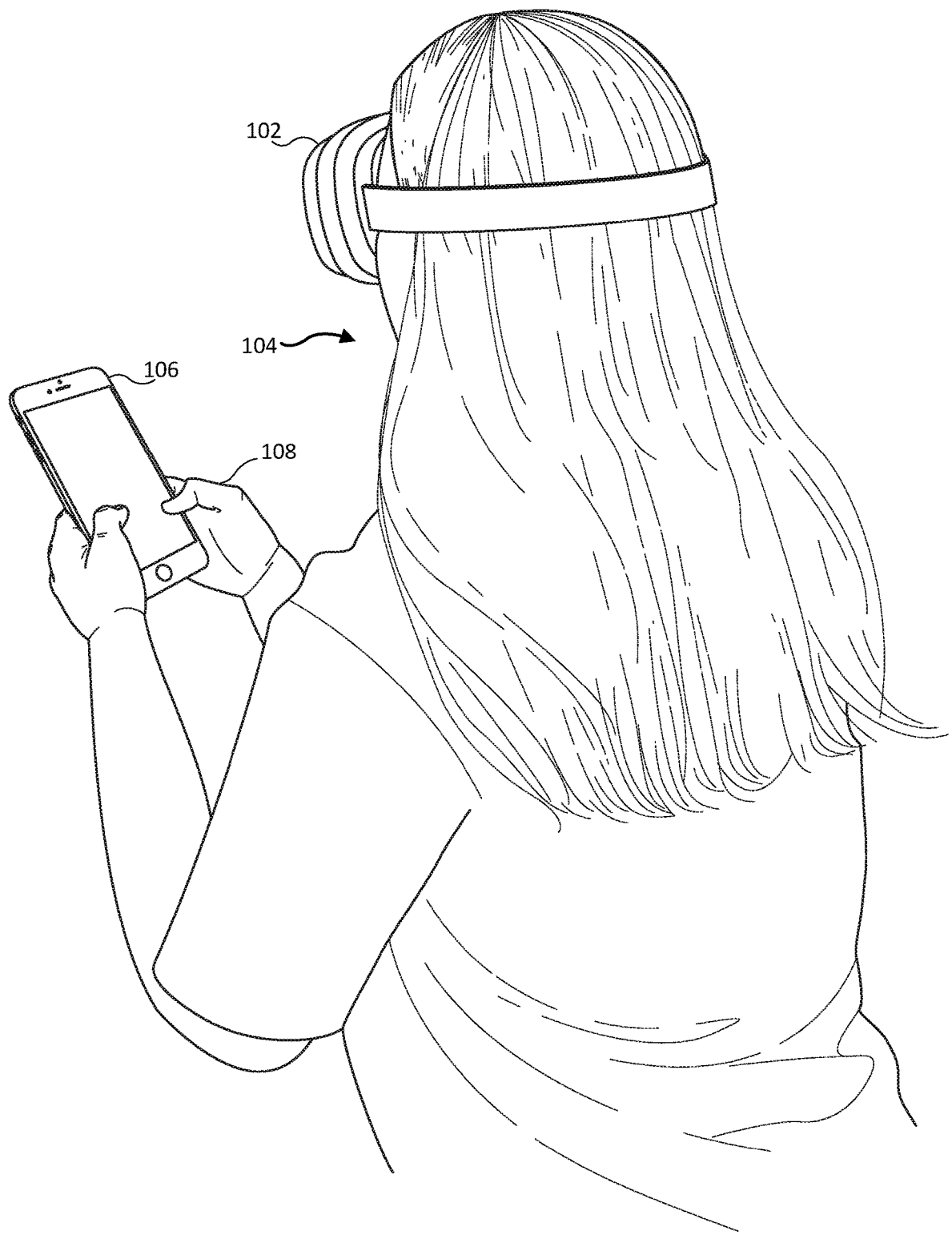
FIG. 1 is an illustration of user wearing a virtual reality device while interfacing to a user interface device.

While the exemplary embodiments described herein are susceptible to various modifications and alternative forms, specific embodiments have been shown by way of example in the appendix and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

Over the last several years, artificial reality systems have revolutionized the way people experience various kinds of digital media. For example, an artificial reality headset may allow users to experience realistic, immersive virtual environments while playing video games, during flight simulation training, or even when interacting with co-workers around the globe. In addition to such artificial-reality applications, wearable artificial reality devices may also enable users to augment reality and/or combine certain aspects of reality with those of the virtual world.

Despite incredible advances in such technology, traditional artificial reality systems may have certain deficiencies that negatively impact the overall user experience. For example, when a user desires to interface with a device (e.g., smartphone) while wearing an artificial reality headset, the field of view of the user may be blocked by the artificial reality headset. While certain systems may contain pass-through optics (either passive or electronic in nature), the resolution of the resulting imagery may be insufficient or integration into the virtual scene may not produce desirable effects. As such, the user may be prevented from interfacing with the device. The present disclosure, therefore, identifies and addresses a need for apparatuses, systems, and methods for virtual representation of user interface devices.

The present disclosure is generally directed to apparatuses, systems, and methods of virtual representation of user interface devices on virtual reality devices. As will be explained in greater detail below, these apparatuses, systems, and methods may provide numerous features and benefits.

The disclosed methods and systems may facilitate user interaction with an external user interface device within a virtual reality environment. An example system may track (e.g., via computer vision, headset tracking cameras, radar ranging, fiducial tracking, inertial measurements, etc.) a location of a user interface device (e.g., a smartphone, a tablet, a remote controller, etc.) within a real-world environment and may receive (e.g., via WiFi, Bluetooth™, a camera, etc.) information associated with an interface of the user interface device (e.g., an interface displayed on a screen of the user interface device). The example system may generate a virtual object for presentation within a virtual environment (e.g., an augmented reality/virtual reality environment) that represents the user interface device and may incorporate at least a portion of the interface of the user interface device into the virtual object. The example system may then present the virtual object within the virtual environment. In some examples, the example system may present the virtual object at a location within the virtual environment that corresponds to the location of the user interface device within the real-world environment. The example system may also detect a user interaction (e.g., via hands and/or fingers of the user) with the virtual environment and may transmit information representative of the interaction to the user interface device, thereby enabling user interaction with the user interface device from within the virtual environment. For example, a user may select, within the virtual environment, a user interface element presented via the virtual object that represents the user interface device. The example system may detect the selection and may transmit information representative of the selection to the user interface device. The example system may also track a position of a hand and/or fingers of the user as the user interacts with the user interface device and may generate and present within the virtual environment a virtual object that represents the hand and/or fingers of the user interacting with the user interface device. Various example implementations may include projecting (e.g., mirroring) content from a user interface device onto one or more surfaces in a virtual reality device (e.g., a display screen in a headset), text input from the user interface device to an augmented reality/virtual reality application, pass-through views of hands and/or fingers of the user interacting with a digitally reconstructed user interface device image, etc.

Figure 6:
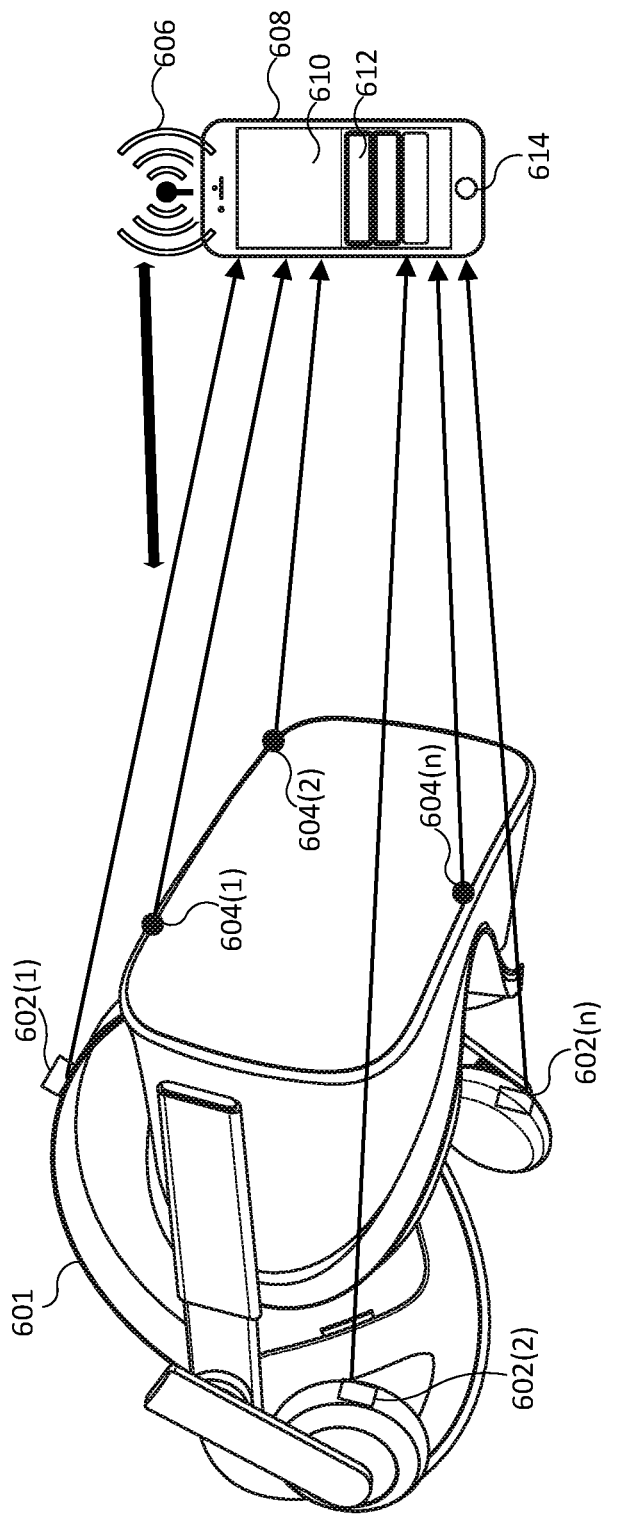
FIG. 6 illustrates a virtual reality device tracking a user interface device.
Figure 7:
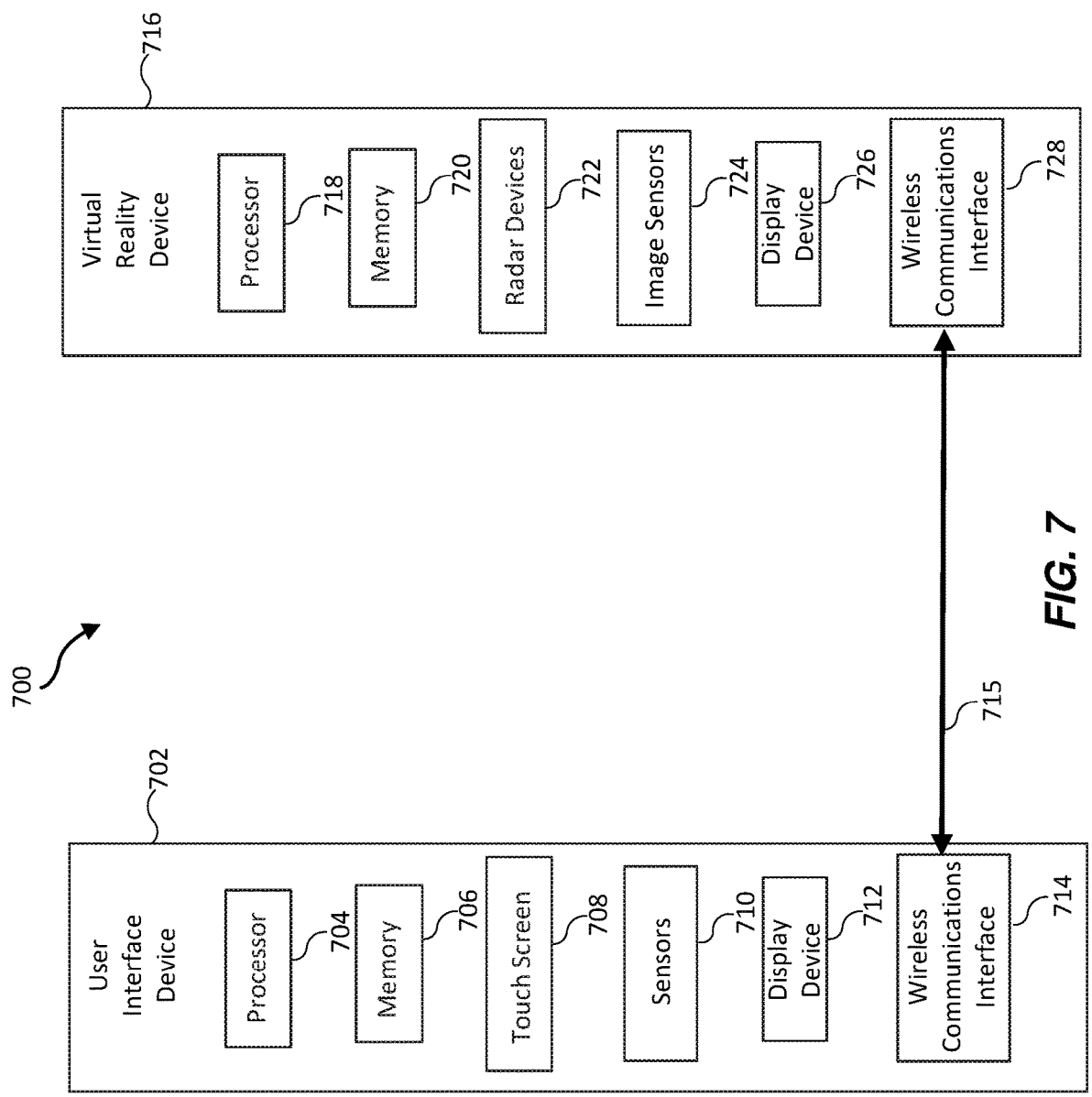
FIG. 7 is a block diagram of an example system for virtual representation of user interface devices.
Figure 8:
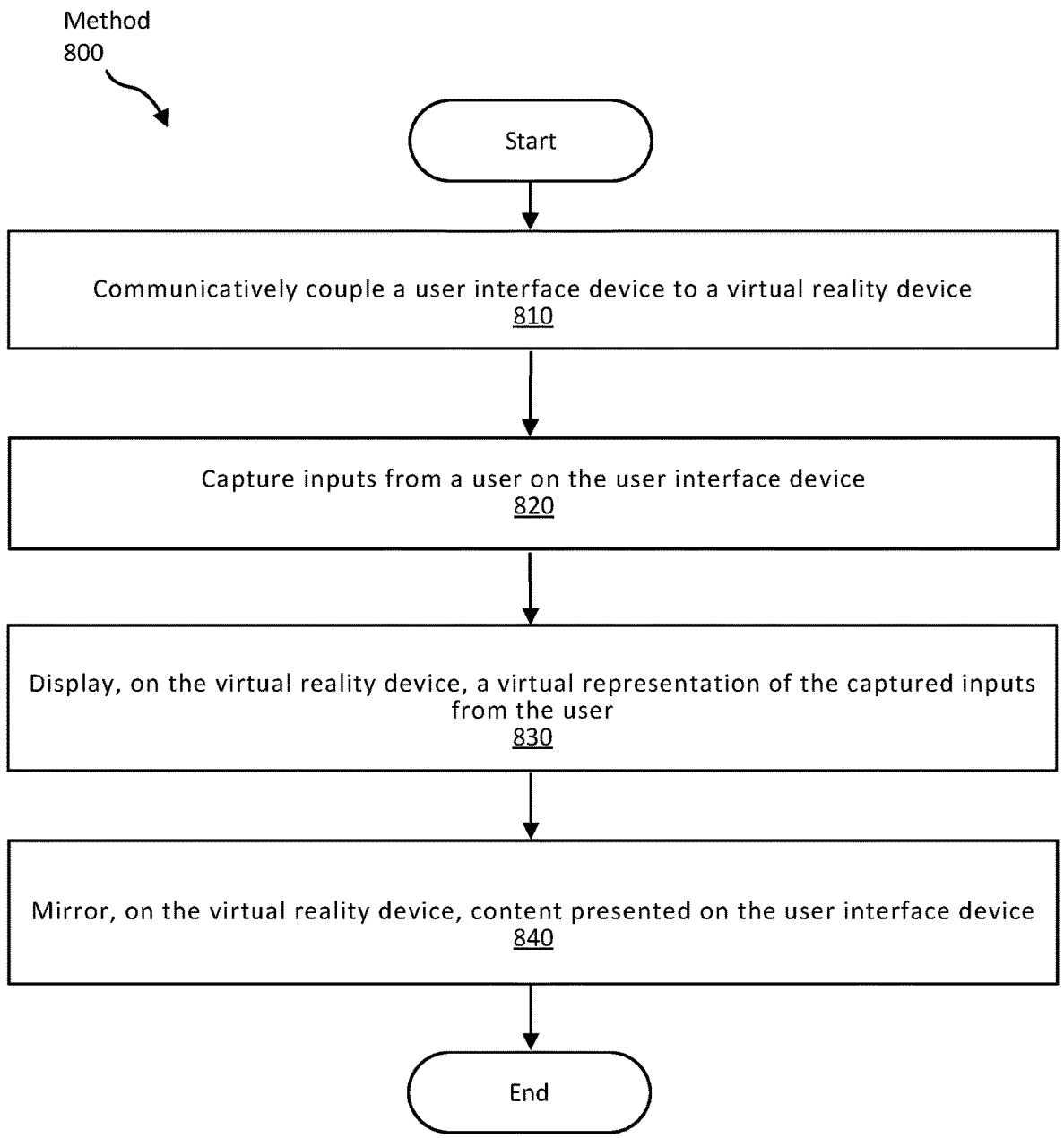
FIG. 8 illustrates a flow chart of an example method of virtual representation of user interface devices on a virtual reality device.

The following will provide, with reference to FIG. 1, a description of a user wearing a virtual reality device and interfacing with a user interface device (e.g., smartphone). FIGS. 2-5 will provide detailed descriptions of methods of generating a virtual representation of objects blocked from the user's field of view by the virtual reality device and mirroring content presented on a user interface device (e.g., smartphone). FIG. 6 will provide detailed descriptions of methods of tracking objects for virtual representation in a virtual reality device. FIG. 7 will provide detailed descriptions of a block diagram of a system for virtual representation of user interface devices. FIG. 8 is a flowchart of a method for virtual representation of user interface devices. FIGS. 9-14 will provide detailed descriptions of exemplary augmented or virtual reality devices that may be used in connection with embodiments of this disclosure.

FIG. 1 is an illustration of user wearing a virtual reality device (e.g., headset) while interfacing to a user interface device (e.g., smartphone). As shown in FIG. 1, user 104 may wear virtual reality device 102. One example of virtual reality device 102 may be a head-worn display system that mostly or completely covers a user's field of view. Virtual reality device 102 may be similar to the headset of virtual reality system 1100 shown in FIG. 11 that may include a front rigid body and a band shaped to fit around the head of user 104. Virtual reality system 102 may also include output audio transducers. Furthermore, while not shown in FIG. 1, virtual reality device 102 may include one or more electronic elements, including one or more electronic displays, one or more inertial measurement units (IMUS), one or more tracking emitters or detectors, and/or any other suitable device or system for creating an artificial reality experience. In some examples, user 104 may desire to use smartphone 106 while wearing virtual reality device 102. For example, user 104 may desire to input information (e.g., text) or select icons (e.g. tap icons on a touchscreen) on smartphone 106. Since virtual reality device 102 may completely cover the field of view of user 104 while wearing virtual reality device 102, user 104 may be unable to see their hands 108 and fingers to properly interface with smartphone 106. As described below with respect to FIG. 4, content (e.g., video, audio, text, etc.) on smartphone 106 may be shared with other local or remote users. Further, content may be shared bidirectionally between smartphone 106 and virtual reality device 102.

Figure 2:
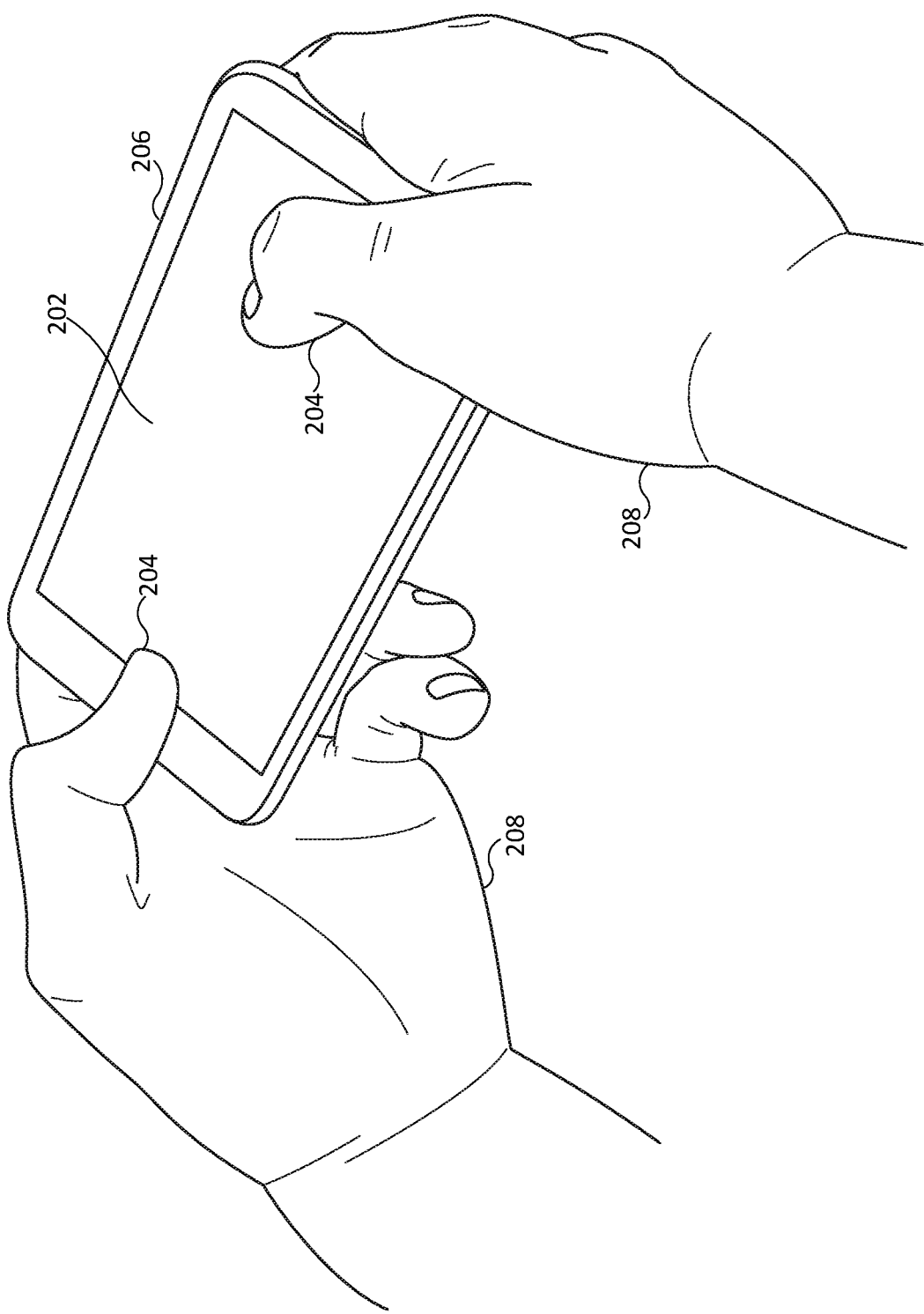
FIG. 2 is an illustration of user interfacing with a user interface device.

FIG. 2 is an illustration of a user interfacing with a user interface device (e.g., smartphone) via the user's hands. As shown in FIG. 2, a user may interface to smartphone 206 by holding smartphone 206 in user hands 208 and touching portions of touchscreen 202 using user fingers 204. As described with respect to FIG. 1, the user may be wearing a virtual reality device that completely covers the user's field of view and therefore prevents the user from directly viewing touchscreen 202 and smartphone 206. Therefore, the user may desire a method of indirectly viewing touchscreen 202 and smartphone 206 while wearing a virtual reality device to allow the user to interact with smartphone 206. In some examples, the virtual reality device and smartphone 206 may be configured to enable the user to view a virtual representation of smartphone 206 and/or hands 208/fingers 204 of the user while wearing the virtual reality device that blocks the user's direct field of view of the real world. The virtual reality device and smartphone 206 may use any method to generate a virtual representation of objects blocked from the user's field of view by the virtual reality device. in some examples, the method may include communicatively coupling (e.g. via wireless communications such as WiFi and/or Bluetooth) smartphone 206 to a virtual reality device and capturing inputs from a user made by user's fingers 204 on touchscreen 202 of smartphone 206. The method may further include displaying on the virtual reality device a virtual representation of the captured inputs from the user, a virtual representation of smartphone 206, and/or mirroring content presented on smartphone 206 to the virtual reality device.

Figure 3:
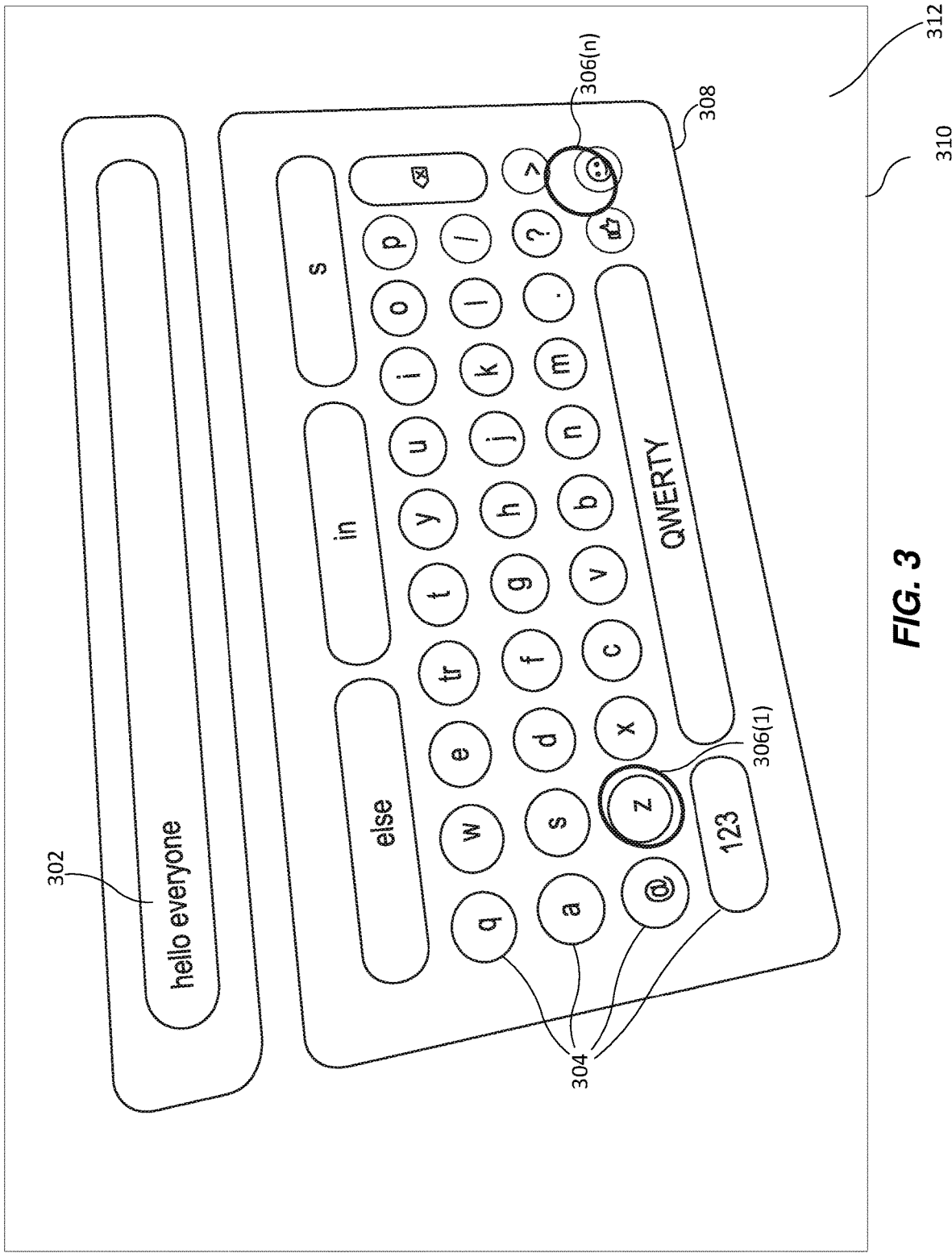
FIG. 3 illustrates a virtual representation of an object displayed on a virtual reality device.

FIG. 3 illustrates a virtual representation of an object displayed on a virtual reality device. FIG. 3 shows an object (e.g., smartphone, user interface device, remote controller, etc.) as it may appear to a user when displayed on a screen of a virtual reality device. Object 308 may be a smartphone and may appear on screen 310 as a virtual representation of the actual smartphone of the user. Object 308 may include, without limitation, text display area 302, alphanumeric keys 304, and position indicator 306. Although FIG. 3 shows object 308 as a smartphone, the present application is not limited to such. Object 308 may be any object a user of a virtual reality device may desire viewing and/or interfacing with including, without limitation, a remote controller, a keyboard, a tablet, a computer screen, a computer mouse, etc. In some examples, a virtual representation of object 308 may be viewed on screen 310 in a position and/or orientation corresponding to the position and/or orientation of the actual object in the real world. As described above with respect to FIG. 2, a user may interface with a smartphone and view the smartphone and/or hands/fingers of the user as virtual objects while interfacing with the smartphone. Further, the virtual representation of object 308 may be viewed in motion by real-time tracking of the position of the real-world object. In some examples, screen 310 may display position indicators 306(1) to 306(n). Position indicators 306(1) to 306(n) may indicate a position of another object(s) (e.g., the user's fingers) as the position of the user's fingers move relative to the position of object 308. For example, position indicators 306(1) to 306(n) may appear as an overlay on top of object 308 and move over object 308 as the user types on the real-world object. The present application is not limited as to the types and number of objects that are tracked and virtually represented on a virtual reality device. For example, a user may interface with an object (e.g. a screen of a smartphone) using a stylus or other pointing object. The virtual reality device may track the stylus and display a virtual representation of the motion and/or position of the stylus on the virtual reality device. The smartphone may include a stylus tracking system and the virtual reality device may track the stylus by receiving tracking data from the smartphone over a wireless link. In some examples, an object (e.g., smartphone 106) may generate content that is not displayed on the object and transmits the generated content to a screen of a virtual reality device (e.g., virtual reality device 102) thus creating a virtual external monitor for the object (e.g., smartphone 106).

As will be further described below with respect to FIGS. 6 and 7, a virtual reality device worn by a user may track the position of object 308 using any suitable method. For example, the position of object 308 may be tracked using, without limitation, computer vision, virtual reality headset tracking cameras, fiducial tracking, inertial measurement unit (IMU) measurements, or a combination thereof. In some examples, a virtual reality device may capture inputs from a user made by the user's fingers on a smartphone that is virtually represented by object 308. The virtual reality device may capture the inputs from the user made on a touchscreen or buttons of the smartphone using any suitable method. For example, inputs from pressure sensitive buttons and/or capacitive/pressure sensitive inputs on a touchscreen may be captured by the smartphone and the captured inputs may be transmitted to the virtual reality device via a wireless protocol such as Bluetooth and/or WiFi. The captured inputs may be sent from the smartphone as cartesian coordinates of the touchscreen areas touched by the user and/or a pressure strength of the touched area. The captured inputs may be indicated on object 308 as the inputs are received by the virtual reality device. For example, the captured inputs may be indicated in real-time on object 308 as a temporary highlighting of the alphanumeric key corresponding to the captured input on the smartphone. Additionally or alternatively, display line 302 may display the captured input as alphanumeric text. in some examples, the smartphone may also receive speech inputs from the user, convert the speech inputs to text corresponding to the speech, and display the converted text in display line 302. In some examples, screen 310 may display background 312 in which object 302 is overlaid onto background 312. Background 312 may represent a virtual environment (e.g., a game, an activity, a location, etc.) that the user is engaged in. For example, a user may be engaged in a virtual reality game or participating in a virtual meeting and may desire to interface to the user's smartphone without removing the virtual reality headset from the user's head. In this case, the user may interface with the smartphone using the methods of virtual representation described above without directly viewing the smartphone. For example, the user may desire to interface with the smartphone without removing the virtual reality device in order to perform tasks including, without limitation, sending and/or receiving a message, viewing notifications arriving on the smartphone, launching an application on the smartphone and/or the virtual reality device, searching for applications on the smartphone and/or the virtual reality device, or a combination thereof. Overlaying object 302 onto background 312 may include displaying object 302 on top of other content. Object 302 may be overlaid onto background 312 using any suitable method. For example, displaying a virtual representation of object 302 and/or captured inputs from object 302 overlaid on background 312 may include capturing an image (e.g. using image sensors on the virtual reality device) of object 302 in a real-world environment, subtracting the image of object 302 from a background of the real-world environment and superimposing the subtracted image of object 302 into a virtual environment of the virtual reality device.

In some examples, a virtual reality device may include a database that stores (for example in memory 720 of FIG. 7) data related to specific objects. For example, the database may include data related to different models of smartphones. The database may include, without limitation, parameters defining function capability of the different models, communication parameters for each model, and images of the exterior portions of each model. When the smartphone is communicatively coupled to the virtual reality device, the smartphone may transmit an identification code to the virtual reality device that indicates the model. The virtual reality device may retrieve data specific to the smartphone model and use the data to interface to the smartphone, track movements of the smartphone, and create a virtual representation of the smartphone.

Figure 4:
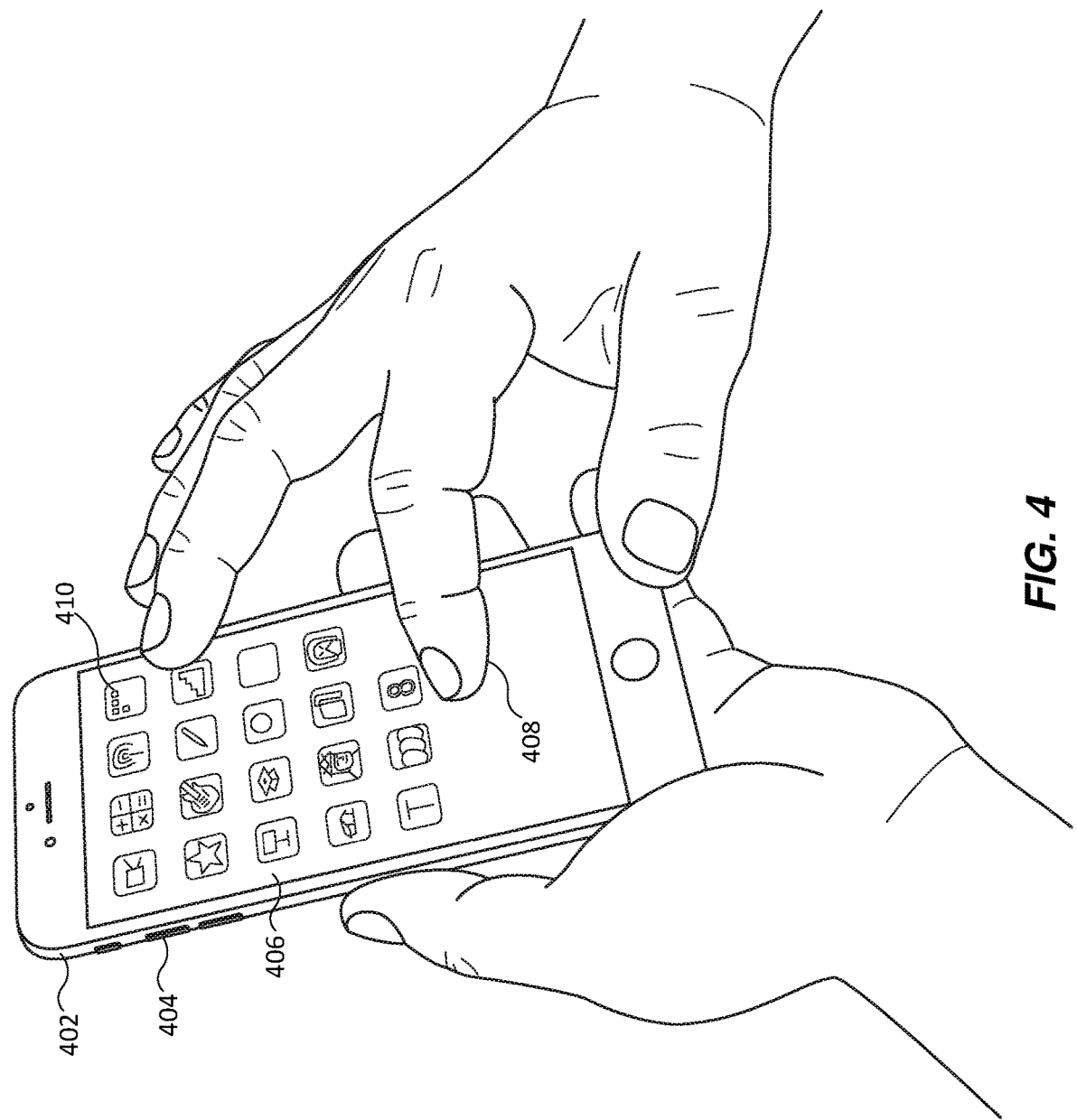
FIG. 4 illustrates a user interacting with content mirrored on a virtual reality device.

FIG. 4 illustrates a user interacting with content mirrored on a virtual reality device. As shown in FIG. 4, a user may interact with a user interface device (e.g., smartphone 402) that presents content 410 to the user. In some examples, content 410 presented on smartphone 402 may also be presented (e.g., mirrored) in real-time on a virtual reality device worn by the user. Further, content 410 presented on smartphone 402 may also be mirrored on devices (e.g., virtual reality devices) of other users, for example, during a virtual meeting with the other users. Content 410 presented on smartphone 402 may be mirrored on a virtual reality device worn by the user using any suitable method. In some examples, mirroring content 410 may include coupling smartphone 410 to a virtual reality device and/or other user's devices and transmitting the content over a wireless communication link (e.g., Bluetooth, WiFi, wide area wireless (e.g., 4G, 5G), etc.). For example, referring to FIG. 7 smartphone 402 may include processor 704 that may execute applications stored in memory 706 that control the transfer of content (mirroring content) presented on user interface device 702 to virtual reality device 716. Smartphone 402 may include wireless communications interface 714 that transfers the content over wireless link 715 to virtual reality device 716. Virtual reality device 716 may present the content to the user on display device 726. Content 410 may include without limitation, video, gaming, application icons, text, speech, music, haptic feedback, or a combination thereof. Video, gaming, application icons, text and other visual content may be mirrored on a display screen of a virtual reality device. Speech, music, and other audio content may be mirrored on audio transducers (e.g., speakers) of a virtual reality device. Haptic feedback and other tactile content may be mirrored on haptic transducers of a virtual reality device. In some examples, a user may interact with content presented on smartphone 406 using the user's finger(s) 408. The user may interact with the content by selecting and/or controlling the playing of the content using buttons 404 and/or touchscreen 406. For example, a user may execute a gaming application on smartphone 402 and interact with the gaming application using buttons 404 and/or touchscreen 406 while viewing the video content of the game mirrored on the display of a virtual reality device and listening to audio content of the game on speakers of the virtual reality device. User inputs from buttons 404 and/or touchscreen 406 may adjust a volume of audio content presented to the user through speakers on the virtual reality device. As another example, content 410 may include application icons and a user may launch applications running on the virtual reality device by selecting the application icons. Content 410 may include settings icons and a user may control the settings (e.g., screen brightness/gamma/contrast settings, etc.) for applications running on the virtual reality device. As described above, content 410 presented on smartphone 402 may also be presented (e.g., mirrored) in real-time on a virtual reality device worn by the user. Content 410 may be presented on a virtual reality device as content viewed on smartphone 410 including a virtual representation of smartphone 410 itself in addition to the content. In some examples, content 410 alone (without a virtual representation of smartphone 410 itself) may be presented on a virtual reality device. For example, content 410 presented on smartphone 402 may be reformatted and displayed on the entire display screen of the virtual reality device.

In some examples, the virtual reality device may track smartphone 402, finger 408 and/or the hands of the user and a virtual representation may be displayed on a screen of the virtual reality device. A virtual representation of these and other objects may be presented to the user as described in detail with respect to FIGS. 3, 6 and 7.

Figure 5:
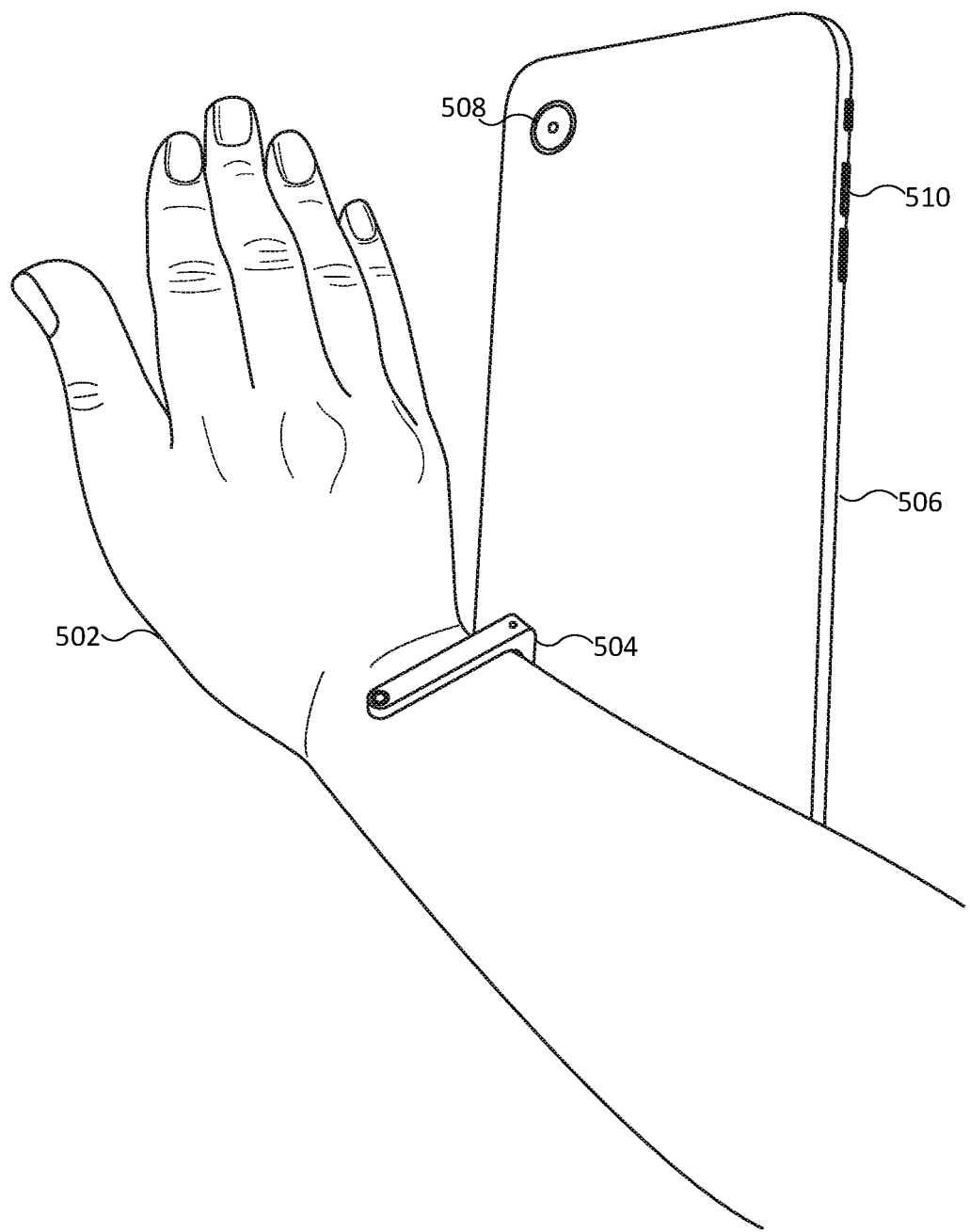
FIG. 5 illustrates a user interacting with a controller for a virtual reality device.

FIG. 5 illustrates a user interacting with a remote controller for a virtual reality device. As shown in FIG. 5, a user may interact with applications running on a virtual reality device using a user interface device (e.g., smartphone 506)

that controls the application. In some examples, hand(s) 502 of the user may hold smartphone 506 and/or holder 504 may secure smartphone 506. Smartphone 506 may be used as a remote controller for controlling the virtual reality device. For example, a user may use smartphone 506 to interact with applications running on the virtual reality device. Smartphone 506 may include input devices such as buttons 510 and a touchscreen that may be used to remotely control applications (e.g., games) running on the virtual reality device. A wireless communications interface (e.g., wireless communications interface 714) may transmit the inputs captured on smartphone 506 to the virtual reality device worn by the user and used to control the application. Smartphone 506 may also include sensor devices including, without limitation, inertial measurement units, image sensors, microphones, proximity sensors, radar ranging sensors, incline sensors, biometric sensors, light sensors, barometric sensors, and compass sensors. In some examples, a wireless communications interface (e.g., wireless communications interface 714) may transmit data from the aforementioned sensors in smartphone 506 to the virtual reality device and used to control application(s) running on the virtual reality device. Further, data from sensors associated with the user and/or the user's environment that are not on smartphone 506 may also be used to control application(s) running on the virtual reality device.

Smartphone 506 may include image sensor 508 that may capture real-world images. Image sensor 508 may capture real-world images including, without limitation, images in the environment surrounding smartphone 506 and images of a user of smartphone 506 (e.g., selfie images). A wireless communications interface (e.g., wireless communications interface 714) may transmit images captured by smartphone 506 to a virtual reality device worn by the user and/or transmitted to other devices including devices of other users. Further, smartphone 506 may also include sound sensors (e.g., microphone) that may capture sound from the user (e.g., speech, singing) and may transmit the captured sound to a virtual reality device worn by the user and/or to other devices including devices of other users. For example, smartphone 506 may act as a handheld microphone to capture a user singing and transmit the singing voice to a karaoke application running on the virtual reality device.

As described above with respect to FIGS. 2-4, smartphone 506 may be represented as an object in a virtual environment of the virtual reality device. Further, the virtual reality device may display objects such as smartphone 506 with animated content around the object. For example, when the user is using smartphone 506 to interact with a gaming application running on the virtual reality device, smartphone 506 may appear to be displayed as a virtual object (e.g., a sword, a gun, a paddle, a laser pointer, etc.) with animated content surrounding and/or extending from the virtual object. In some examples, smartphone 506 may be communicatively coupled to a virtual reality device, smartphone 506 may capture inputs from a user, display a virtual representation of the captured inputs on a virtual reality device, and mirror content presented on the user interface device on the virtual reality device.

FIG. 6 illustrates a virtual reality device tracking a user interface device. As described above with respect to FIGS. 2-5 a virtual reality device may track a position and/or orientation of a user interface device (e.g./smartphone) with respect to the virtual reality device. The virtual reality device may track the position and/or orientation of the smartphone using any suitable method. The position of smartphone 608 may be tracked using, without limitation, computer vision, virtual reality headset tracking cameras, laser ranging, sonar ranging, radar ranging, fiducial tracking, inertial measurement unit (IMU) measurements, or a combination thereof. For example, referring to FIG. 6, image sensors 604(1) to 604(n) may determine the position and/or orientation of smartphone 608 with respect to virtual reality device 601. Image sensors 604(1) to 604(n) may capture images in the field of view of image sensors 604(1) to 604(n) and may include images of smartphone 608 and a background of smartphone 608. In some examples, a processor (e.g., processor 718 of FIG. 7) in virtual reality device 601 may process the images from image sensors 604(1) to 604(2) and distinguish between images of smartphone 608 and the background of smartphone 608. Further, a processor (e.g., processor 718 of FIG. 7) in virtual reality device 601 may subtract the image of smartphone 608 from the background in order to distinguish the images of the smartphone 608 from the background. In some examples, image sensors 604(1) to 604(n) may be disposed on a front face of virtual reality device 601 and may be separated by a distance. Each of image sensors 604(1) to 604(n) separated by a distance may acquire a different perspective image of smartphone 608. Further, the processor in virtual reality device 601 may use each of the different perspective images of smartphone 608 to determine a 3-dimensional position of smartphone 608 with respect to virtual reality device 601 using any suitable method such as, for example a geometric triangularization method.

In another example, ranging devices 602(1) to 602(n) may determine the position and/or orientation of smartphone 608 with respect to virtual reality device 601. Ranging devices 602(1) to 602(n) may use radar and/or laser ranging methods to determine the range of a target object. Ranging devices 602(1) to 602(n) may transmit a swept radar signal and/or a laser signal in the vicinity of smartphone 608. Smartphone 608 may reflect the swept radar signal and/or laser signal and the reflected signal may be received by ranging devices 602(1) to 602(n). In some examples, a processor (e.g., processor 718 of FIG. 7) in virtual reality device 601 may process the reflected radar and/or laser signals and determine a range (e.g., distance) from each of ranging devices 602(1) to 602(n) to smartphone 608. Ranging devices 602(1) to 602(n) may be separated by a distance. Each of ranging devices 602(1) to 602(n) separated by a distance may determine the distance to smartphone 608. Further, the processor in virtual reality device 601 may use each of the distances to smartphone 608 to determine a 3-dimensional position of smartphone 608 with respect to virtual reality device 601 using any suitable method, such as, for example, a geometric triangularization method.

In some examples, virtual reality device 601 may track smartphone 608 using fiducial markers on smartphone 608. Image sensors 604(1) to 604(n) may recognize the fiducial markers may include features of smartphone 608 including, without limitation, button 614, icon 612, or other distinguishable feature of smartphone 608. Additionally or alternatively, the fiducial markers may include objects displayed on screen 610 of smartphone 608 including, without limitation, quick response (QR) codes, or primitive shapes such as points, squares, and circles. In some examples, fiducial markers may also be built into smartphone 608 or a case enclosing smartphone 608. Fiducial markers may include, without limitation, reflective markers, printed markers, or actively lit markers (e.g., light emitting diodes). Fiducial markers may be of a known geometry and a processor (e.g., processor 718 of FIG. 7) in virtual reality device 601 may store the fiducial marker geometry in order to track the position of the fiducial marker within the field of view of image sensors 604(1) to 604(n). Tracking the position of the fiducial marker on smartphone 608 within the field of view of image sensors 604(1) to 604(n) may enable the processor of virtual reality device 601 to determine a position and/or orientation of smartphone 608 relative to virtual reality device 601.

The position determination methods described with respect to FIG. 6 are non-exclusive of one another and any combination of methods may be used. Further, the methods may also include the use of sensors within smartphone 608. For example, smartphone 608 may include an inertial measurement unit (IMU). The IMU may include a combination of accelerometers and gyroscopes that may measure linear acceleration in any direction and rotational rate of smartphone 608 including pitch, roll and yaw. The IMU may periodically measure linear and/or rotational acceleration and transmit the data related to the acceleration of smartphone 608 to virtual reality device 601 over wireless link 606. The IMU data may be used in conjunction with the positional data described above to determine a 3-dimensional position and/or orientation of smartphone 608 with respect to virtual reality device 601.

In some examples, the tracking methods described above may be activated when smartphone 608 is in proximity to virtual reality device 601 and deactivated when smartphone 608 is not in proximity to virtual reality device 601. The tracking methods may be manually or automatically activated when smartphone 608 is in proximity to virtual reality device 601. For example, smartphone 608 and/or virtual reality device 601 may include a proximity sensing method, including without limitation, Bluetooth™ received signal strength indicator (RSSI), WiFi RSSI, radar ranging, LED and IR light detector, image sensing, or a combination thereof. When the proximity sensing method detects that smartphone 608 is within a threshold distance from and/or in a certain position relative to virtual reality device 601, virtual reality device 601 may automatically execute the tracking methods to track the position and/or orientation of smartphone 608. When the proximity sensing method detects that smartphone 608 is not within a threshold distance from and/or in a certain position relative to virtual reality device 601, virtual reality device 601 may stop executing the tracking methods.

FIG. 7 is a block diagram of an example system for virtual representation of user interface devices. Referring to FIG. 7, system 700 may implement a method that includes communicatively coupling a user interface device to a virtual reality device, capturing inputs from a user on the user interface device, displaying, on the virtual reality device, a virtual representation of the captured inputs from the user, and mirroring, on the virtual reality device, content presented on the user interface device. System 700 may include user interface device 702 and virtual reality device 716. User interface device 702 and virtual reality device 716 may each include wireless communications interface 714 and 728 respectively. Wireless communications interface 714 and 728 may enable user interface device 702 and virtual reality device 716 to communicate data to one another related to capturing inputs from a user on the user interface device, displaying, on the virtual reality device, a virtual representation of the captured inputs from the user, and mirroring, on the virtual reality device, content presented on the user interface device.

User interface device 702 and virtual reality device 716 may each include processors 704 and 718 and memory 706 and 720 respectively. Processor 704 may execute applications stored in memory 706 and/or execute control functions related to tracking user interface device 702 while virtual reality device 716 is displaying a virtual representation of inputs captured from a user of user interface device 702 and/or mirroring content presented on user interface device 702. As described above with respect to FIGS. 2-5, a user may wear virtual reality device 716 that completely covers the user's field of view and therefore prevents the user from directly viewing user interface device 702. The user may desire a method of indirectly viewing display device 712 and user interface device 702 while wearing virtual reality device 712 to allow the user to interact with user interface device 702. In some examples, virtual reality device 712 and user interface device 702 may be configured to enable the user to view a virtual representation of user interface device 702 and the hands of the user while wearing virtual reality device 712 that blocks the user's direct field of view of the real world. Virtual reality device 716 and user interface device 702 may use any method to generate a virtual representation of objects blocked from the user's field of view by virtual reality device 716. in some examples, the method may include communicatively coupling user interface device 702 to virtual reality device 716 through wireless communication interfaces 714 and 728 and capturing inputs from a user on touchscreen 708. The method may further include displaying on display device 726 of virtual reality device 716, a virtual representation of the captured inputs from the user and/or mirroring content presented on user interface device 702 (e.g., content displayed on display device 712).

As described above with respect to FIG. 6, virtual reality device 716 may track a position and/or orientation of user interface device 702 with respect to virtual reality device 716. Virtual reality device 716 may track the position and/or orientation of user interface device 702 using any suitable method. The position of user interface device 702 may be tracked using, without limitation, computer vision, virtual reality headset tracking cameras, sonar ranging, radar ranging, fiducial tracking, inertial measurement unit (IMU) measurements, or a combination thereof. For example, image sensors 724 may determine the position and/or orientation of user interface device 702 with respect to virtual reality device 716. Image sensors 724 may capture multiple perspective images of objects including user interface device 702, hands/fingers of a user, fiducials, and a background of user interface device 702. Processor 718 may use each of the different perspective images to determine a 3-dimensional position of the objects with respect to virtual reality device 716 using methods such as a geometric triangularization method. In another example, radar devices 722 may determine the position and/or orientation of user interface device 702 with respect to virtual reality device 716. Radar devices 722 may transmit a swept radar signal in the vicinity of user interface device 702 and receive a signal reflected by user interface device 702. Processor 718 may process the reflected radar signals and determine a range (e.g., distance) from each of radar devices 722 to user interface device 702. Further, processor 718 may use the distances to determine a 3-dimensional position of user interface device 702 with respect to virtual reality device 716 using methods such as a geometric triangularization method.

User interface device 702 may include sensors 710. Sensors 710 may include proximity sensors for sensing proximity to virtual reality device 716. Sensors 710 may include, without limitation, inertial measurement units (IMU), image sensors, microphones, proximity sensors, radar ranging sensors, incline sensors, biometric sensors, light sensors, barometric sensors, near field sensors, and compass sensors. As described with respect to FIG. 6, sensors 710 may assist virtual reality device 716 in the tracking of objects. For example, user interface device 702 may include an IMU that measures linear acceleration in any direction and rotational rate of user interface device 702 including pitch, roll and yaw. The IMU may periodically measure linear and/or rotational acceleration of user interface device 702 and transmit the data related to virtual reality device 716 over wireless communications link 715. The IMU data may be used in conjunction with the positional tracking data described above to determine a 3-dimensional position and/or orientation of user interface device 702 with respect to virtual reality device 716.

FIG. 8 illustrates a flow chart of an example method of virtual representation of user interface devices on a virtual reality device. As shown in FIG. 8, method 800 may include, at step 810, communicatively coupling a user interface device to a virtual reality device. At step 820, the method may include capturing inputs from a user on the user interface device. At step 830, the method may include displaying, on the virtual reality device, a virtual representation of the captured inputs from the user. At step 840, the method may include mirroring, on the virtual reality device, content presented on the user interface device.

In one example a method may include communicatively coupling a user interface device to a virtual reality device. In some examples, the method may further include capturing inputs from a user on the user interface device, displaying, on the virtual reality device, a virtual representation of the captured inputs from the user, and mirroring, on the virtual reality device, content presented on the user interface device.

In some examples, the virtual representation of the captured inputs from the user may include tracking movements of at least one of at least one hand of the user or the user interface device.

In some examples, tracking movements may include determining at least one of a location or orientation of the at least one hand of the user or the user interface device.

In some examples, determining the at least one of a location or orientation of the at least one hand of the user or the user interface device may be based on at least one of inertial measurement data transmitted from the user interface device to the virtual reality device, radar ranging data from a radar device on the virtual reality device, or image tracking data from an image sensor on the virtual reality device.

In some examples, capturing the inputs from the user on the user interface device may include capturing images via an image sensor on the virtual reality device.

In some examples, the inputs from the user may include at least one of a text input, a voice input, or a selection input.

In some examples, displaying, on the virtual reality device, a virtual representation of the captured inputs from the user may include capturing an image of the user interface device in a real-world environment, subtracting the image of the user interface device from a background of the real-world environment, and superimposing the subtracted image of the user interface device into a virtual environment of the virtual reality device.

In some examples, a position of the subtracted image of the user interface device in the virtual environment may correspond to a location of the user interface device within the real-world environment.

In some examples, mirroring, on the virtual reality device, content presented on the user interface device may include a wireless transmission of the content from the interface device to the virtual reality device.

In some examples, the method may further include displaying, on the virtual reality device, a virtual representation of the user interface device.

In some examples, the method may further include displaying, on the virtual reality device, animated content around the user interface device.

In some examples, the method may further include mirroring, on a virtual reality device associated with another user, the content presented on the user interface device.

In some examples, the captured inputs from the user on the user interface device may function as controls for the virtual reality device.

In some examples, the user interface device may be at least one of a smartphone, a keyboard, a display, a tablet device, or a remote controller.

In one example, a system may include a user interface device communicatively coupled to a virtual reality device. In some examples, the user interface device may capture inputs from a user, the virtual reality device may display a virtual representation of the captured inputs from the user, and the virtual reality device may mirror content presented on the user interface device.

In some examples, the virtual representation of the captured inputs from the user may include tracking movements of at least one of at least one hand of the user or the user interface device.

In some examples, tracking movements may include determining at least one of a location or orientation of the at least one hand of the user or the user interface device.

In some examples, determining the at least one of a location or orientation of the at least one hand of the user or the user interface device may be based on at least one of inertial measurement data transmitted from the user interface device to the virtual reality device, radar ranging data from a radar device on the virtual reality device, or image tracking data from the image sensor on the virtual reality device.

In some examples, capturing the inputs from the user on the user interface device may include capturing images via an image sensor on the virtual reality device.

In one example, a computer-readable medium may include computer-readable instructions that, when executed by at least one processor of a computing device, cause the computing device to communicatively couple a user interface device to a virtual reality device, capture inputs from a user on the user interface device, display a virtual representation of the captured inputs from the user on the virtual reality device, and mirror content presented on the user interface device on the virtual reality device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 900 in FIG. 9. Other artificial reality systems may include a NED that also provides visibility into the real world (e.g., augmented-reality system 1000 in FIG. 10) or that visually immerses a user in an artificial reality (e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
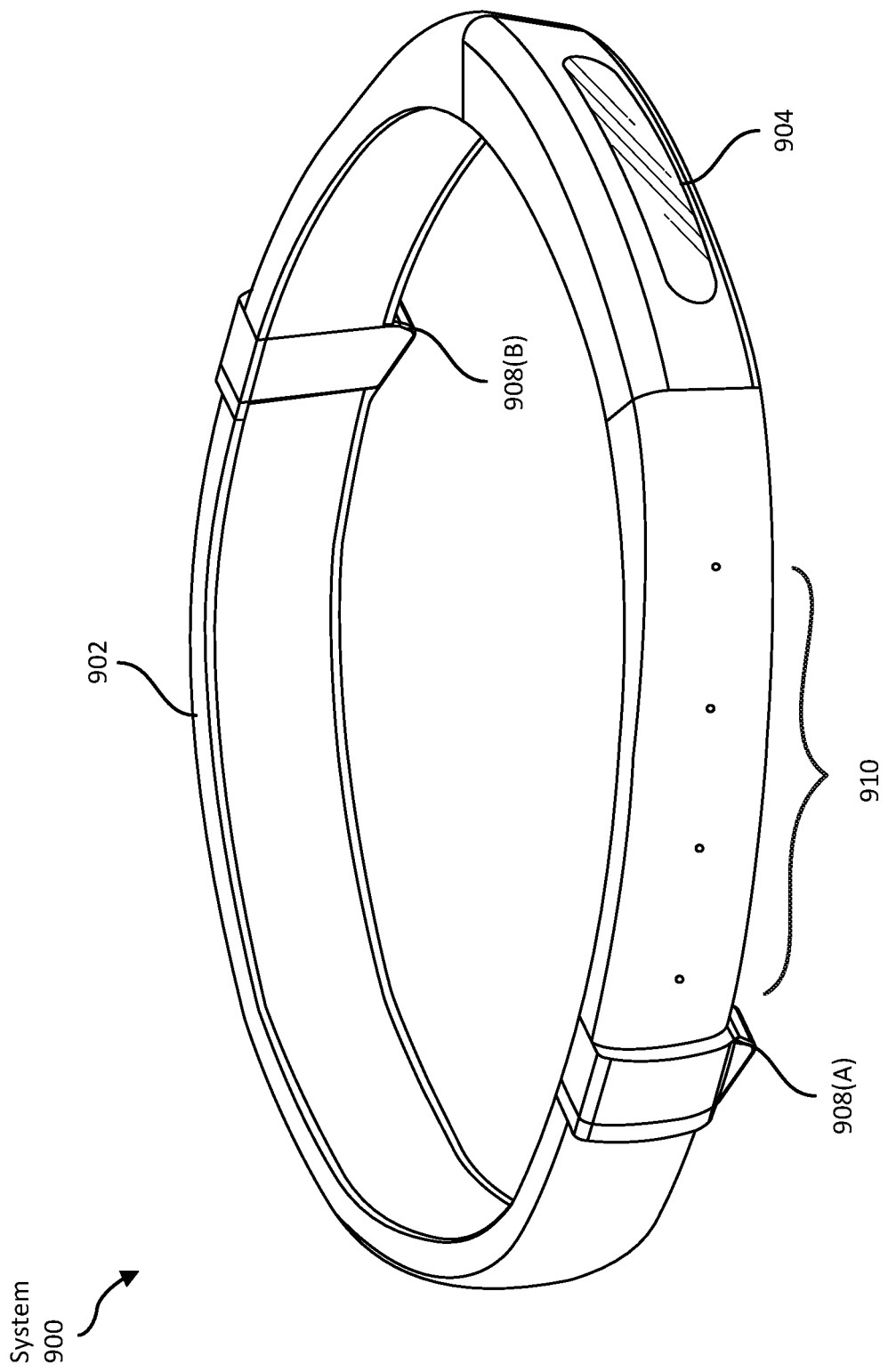
FIG. 9 is an illustration of an exemplary artificial-reality headband that may be used in connection with embodiments of this disclosure.

Turning to FIG. 9, augmented-reality system 900 generally represents a wearable device dimensioned to fit about a body part (e.g., a head) of a user. As shown in FIG. 9, system 900 may include a frame 902 and a camera assembly 904 that is coupled to frame 902 and configured to gather information about a local environment by observing the local environment. Augmented-reality system 900 may also include one or more audio devices, such as output audio transducers 908(A) and 908(B) and input audio transducers 910. Output audio transducers 908(A) and 908(B) may provide audio feedback and/or content to a user, and input audio transducers 910 may capture audio in a user's environment.

As shown, augmented-reality system 900 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 900 may not include a NED, augmented-reality system 900 may include other types of screens or visual feedback devices (e.g., a display screen integrated into a side of frame 902).

Figure 10:
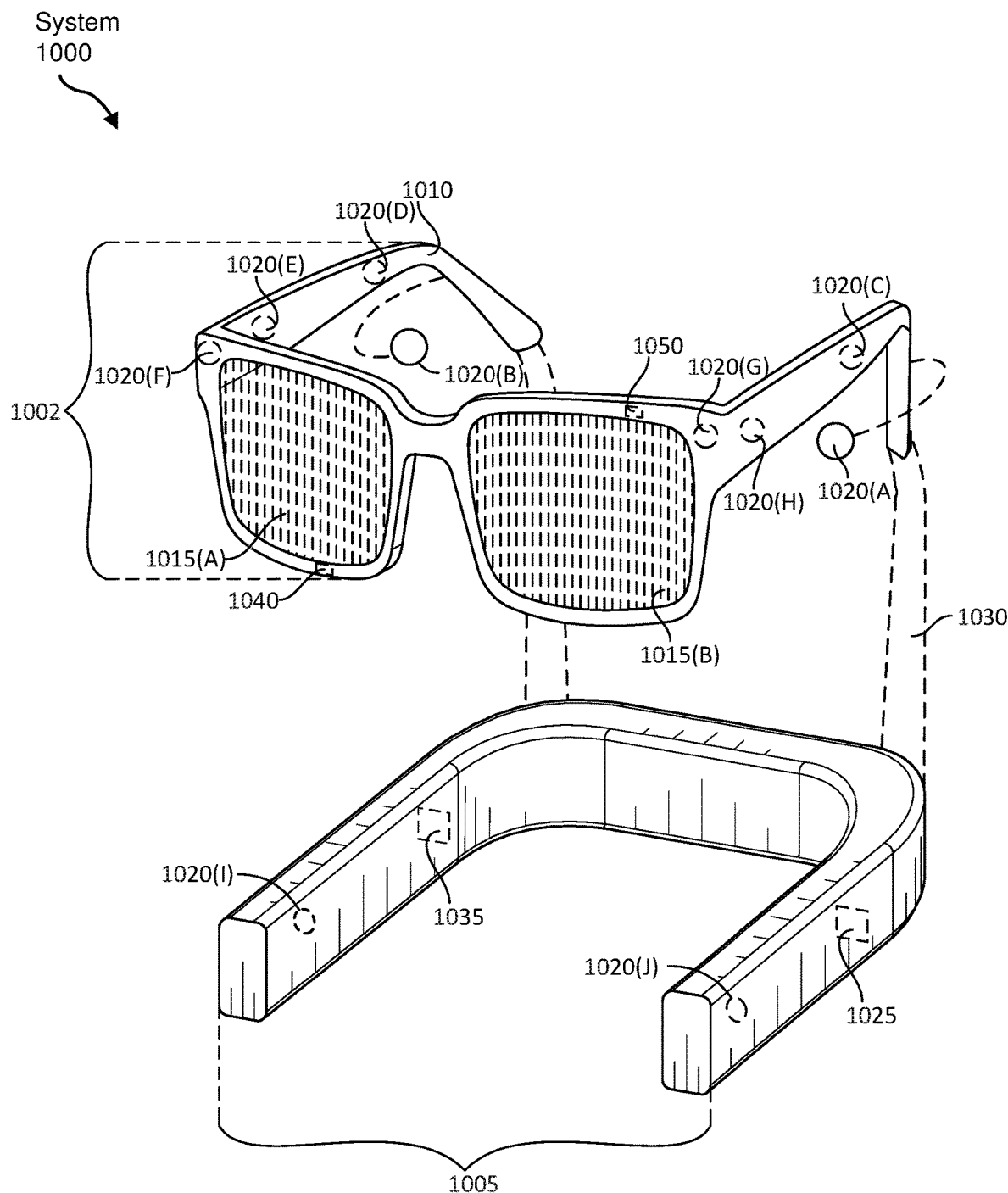
FIG. 10 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent a position sensor, an inertial measurement unit (IMU), a depth camera assembly, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

Augmented-reality system 1000 may also include a microphone array with a plurality of acoustic transducers 1020(A)-1020(J), referred to collectively as acoustic transducers 1020. Acoustic transducers 1020 may be transducers that detect air pressure variations induced by sound waves. Each acoustic transducer 1020 may be configured to detect sound and convert the detected sound into an electronic format (e.g., an analog or digital format). The microphone array in FIG. 2 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(1) and 1020(J), which may be positioned on a corresponding neckband 1005.

In some embodiments, one or more of acoustic transducers 1020(A)-(F) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by the controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer, or some combination thereof.

Acoustic transducers 1020(A) and 1020(B) may be positioned on different parts of the user's ear, such as behind the pinna or within the auricle or fossa. Or, there may be additional acoustic transducers on or surrounding the ear in addition to acoustic transducers 1020 inside the ear canal. Having an acoustic transducer positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A)

and 1020(B) may be connected to augmented-reality system 1000 via a wired connection 1030, and in other embodiments, acoustic transducers 1020(A) and 1020(B) may be connected to augmented-reality system 1000 via a wireless connection (e.g., a Bluetooth connection). In still other embodiments, acoustic transducers 1020(A) and 1020(B) may not be used at all in conjunction with augmented-reality system 1000.

Acoustic transducers 1020 on frame 1010 may be positioned along the length of the temples, across the bridge, above or below display devices 1015(A) and 1015(B), or some combination thereof. Acoustic transducers 1020 may be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers and other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof. Furthermore, Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(1) and 1020(J)) that are part of the microphone array (or potentially form their own microphone subarray). Neckband 1005 may also include a controller 1025 and a power source 1035.

Acoustic transducers 1020(1) and 1020(J) of neckband 1005 may be configured to detect sound and convert the detected sound into an electronic format (analog or digital). In the embodiment of FIG. 10, acoustic transducers 1020(1) and 1020(J) may be positioned on neckband 1005, thereby increasing the distance between the neckband acoustic transducers 1020(1) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1100 and/or virtual-reality system 1100 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 900, augmented-reality system 1000, and/or virtual-reality system 1100 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 9 and 11, output audio transducers 908(A), 908(B), 1106(A), and 1106(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 910 may include condenser microphones, dynamic microphones, ribbon microphones, and/or any other type or form of input transducer. In some embodiments, a single transducer may be used for both audio input and audio output.

Figure 11:
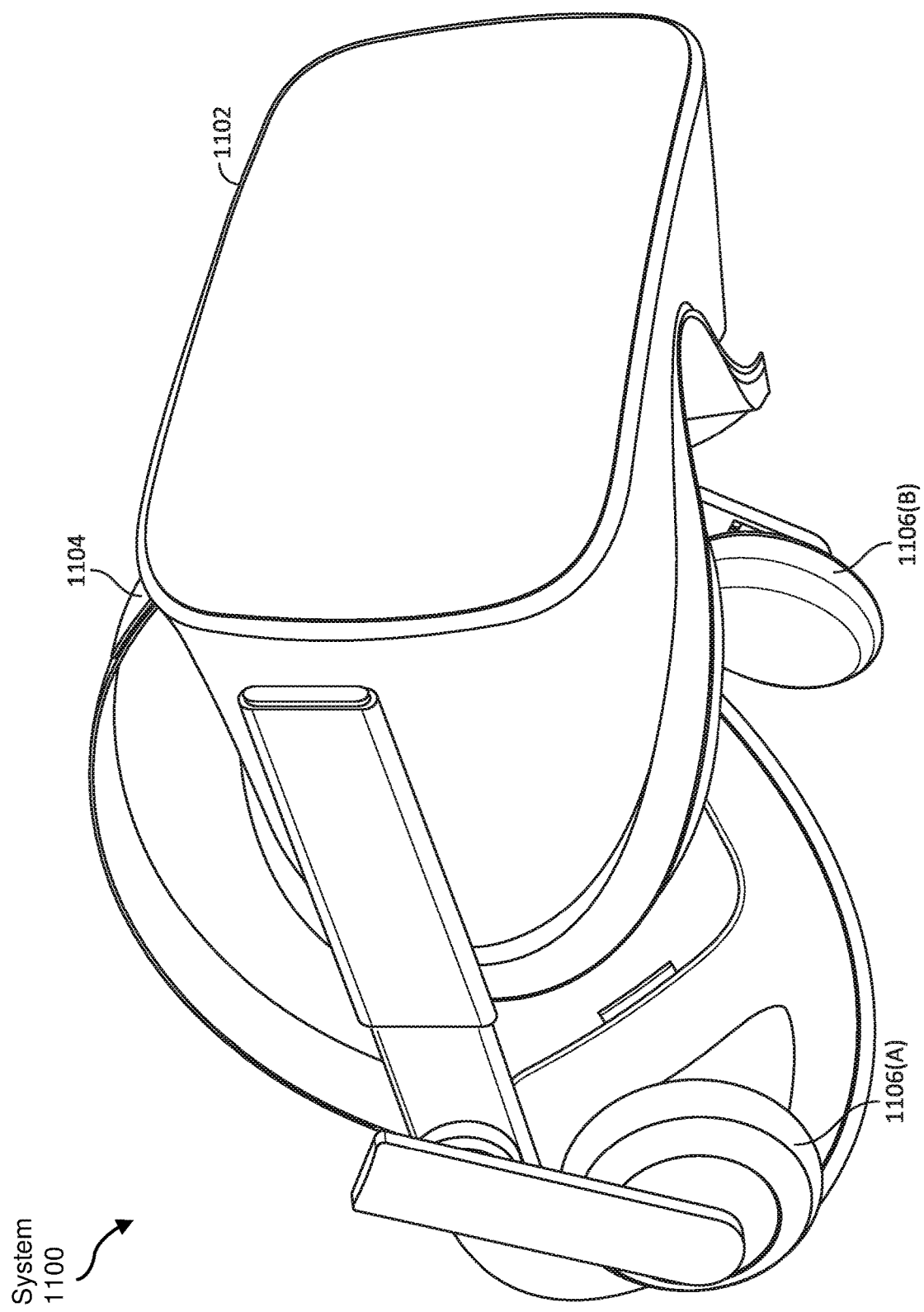
FIG. 11 is an illustration of an exemplary virtual-reality headset that may be used in connection with embodiments of this disclosure.

While not shown in FIGS. 9-11, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 900, 1000, and 1100 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 12:
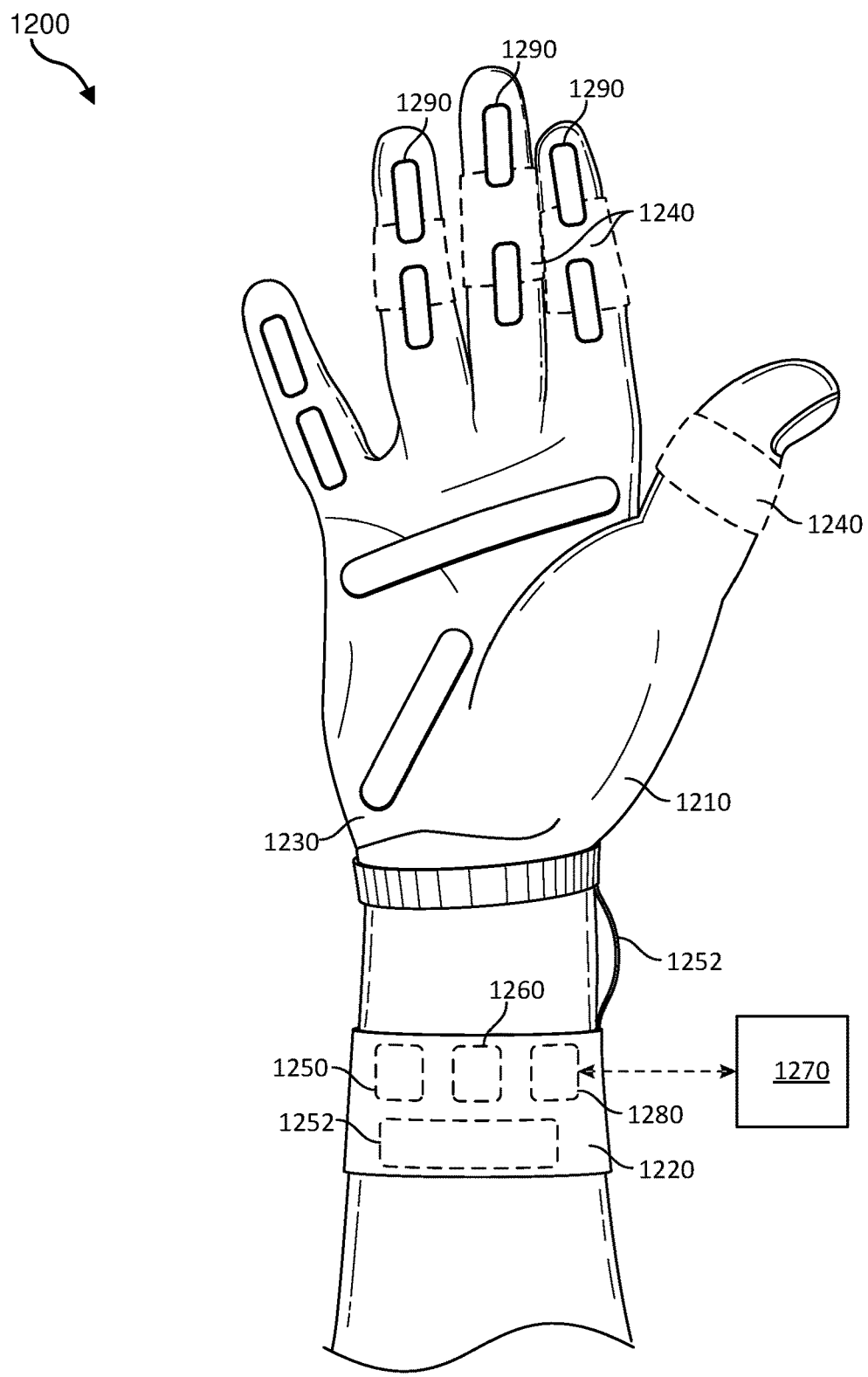
FIG. 12 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 12 illustrates a vibrotactile system 1200 in the form of a wearable glove (haptic device 1210) and wristband (haptic device 1220). Haptic device 1210 and haptic device 1220 are shown as examples of wearable devices that include a flexible, wearable textile material 1230 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1240 may be positioned at least partially within one or more corresponding pockets formed in textile material 1230 of vibrotactile system 1200. Vibrotactile devices 1240 may be positioned in locations to provide a vibrating sensation (e.g., haptic feedback) to a user of vibrotactile system 1200. For example, vibrotactile devices 1240 may be positioned to be against the user's finger(s), thumb, or wrist, as shown in FIG. 12. Vibrotactile devices 1240 may, in some examples, be sufficiently flexible to conform to or bend with the user's corresponding body part(s).

A power source 1250 (e.g., a battery) for applying a voltage to the vibrotactile devices 1240 for activation thereof may be electrically coupled to vibrotactile devices 1240, such as via conductive wiring 1252. In some examples, each of vibrotactile devices 1240 may be independently electrically coupled to power source 1250 for individual activation. In some embodiments, a processor 1260 may be operatively coupled to power source 1250 and configured (e.g., programmed) to control activation of vibrotactile devices 1240.

Vibrotactile system 1200 may be implemented in a variety of ways. In some examples, vibrotactile system 1200 may be a standalone system with integral subsystems and components for operation independent of other devices and systems. As another example, vibrotactile system 1200 may be configured for interaction with another device or system 1270. For example, vibrotactile system 1200 may, in some examples, include a communications interface 1280 for receiving and/or sending signals to the other device or system 1270. The other device or system 1270 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1280 may enable communications between vibrotactile system 1200 and the other device or system 1270 via a wireless (e.g., Wi-Fi, Bluetooth, cellular, radio, etc.) link or a wired link. If present, communications interface 1280 may be in communication with processor 1260, such as to provide a signal to processor 1260 to activate or deactivate one or more of the vibrotactile devices 1240.

Vibrotactile system 1200 may optionally include other subsystems and components, such as touch-sensitive pads 1290, pressure sensors, motion sensors, position sensors, lighting elements, and/or user interface elements (e.g., an on/off button, a vibration control element, etc.). During use, vibrotactile devices 1240 may be configured to be activated for a variety of different reasons, such as in response to the user's interaction with user interface elements, a signal from the motion or position sensors, a signal from the touch-sensitive pads 1290, a signal from the pressure sensors, a signal from the other device or system 1270, etc.

Although power source 1250, processor 1260, and communications interface 1280 are illustrated in FIG. 12 as being positioned in haptic device 1220, the present disclosure is not so limited. For example, one or more of power source 1250, processor 1260, or communications interface 1280 may be positioned within haptic device 1210 or within another wearable textile.

Figure 13:
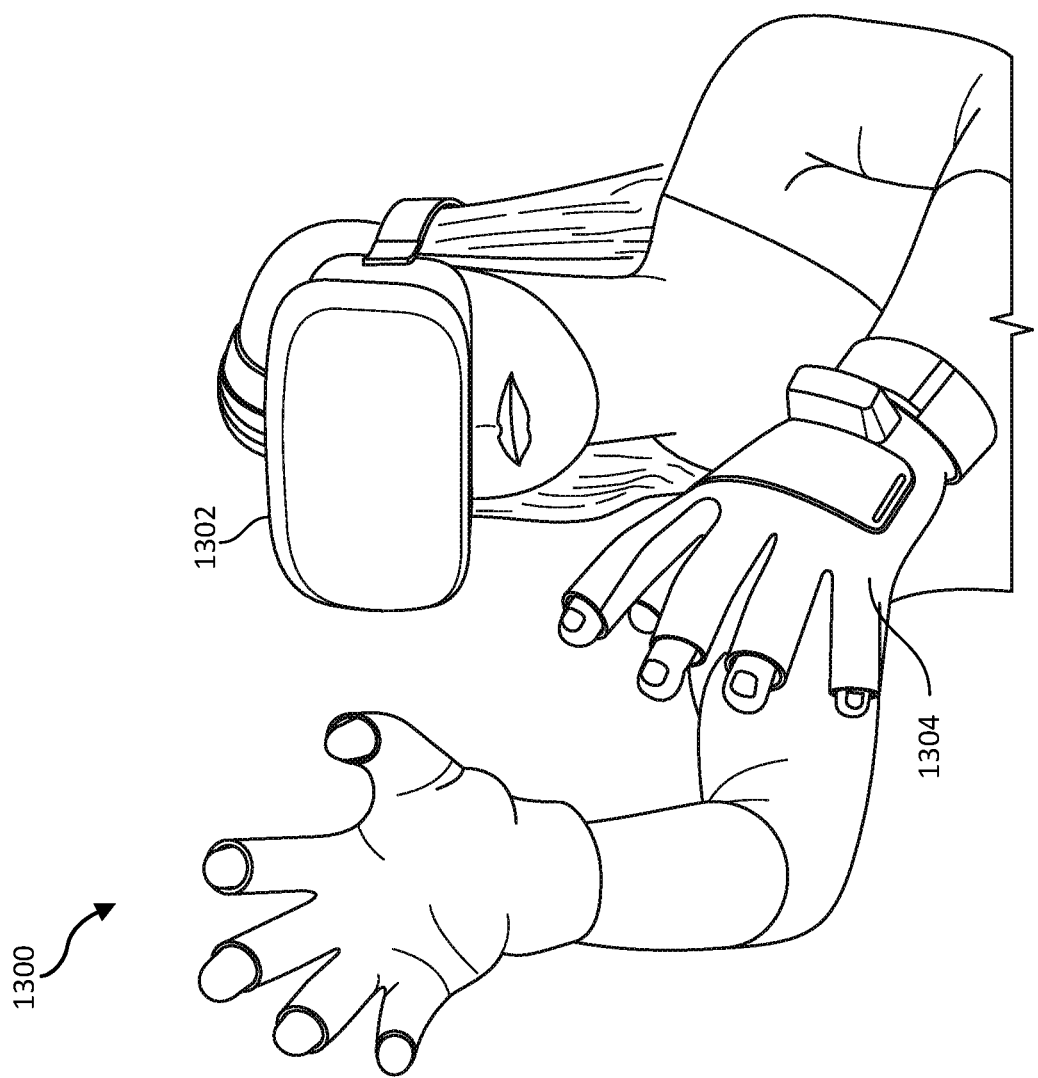
FIG. 13 is an illustration of an exemplary virtual-reality environment according to embodiments of this disclosure.

Haptic wearables, such as those shown in and described in connection with FIG. 12, may be implemented in a variety of types of artificial-reality systems and environments. FIG. 13 shows an example artificial reality environment 1300 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1302 generally represents any type or form of virtual-reality system, such as virtual-reality system 1100 in FIG. 11. Haptic device 1304 generally represents any type or form of wearable device, worn by a use of an artificial reality system, that provides haptic feedback to the user to give the user the perception that he or she is physically engaging with a virtual object. In some embodiments, haptic device 1304 may provide haptic feedback by applying vibration, motion, and/or force to the user. For example, haptic device 1304 may limit or augment a user's movement. To give a specific example, haptic device 1304 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1304 to send action requests to a console. Examples of action requests include, without limitation, requests to start an application and/or end the application and/or requests to perform a particular action within the application.

Figure 14:
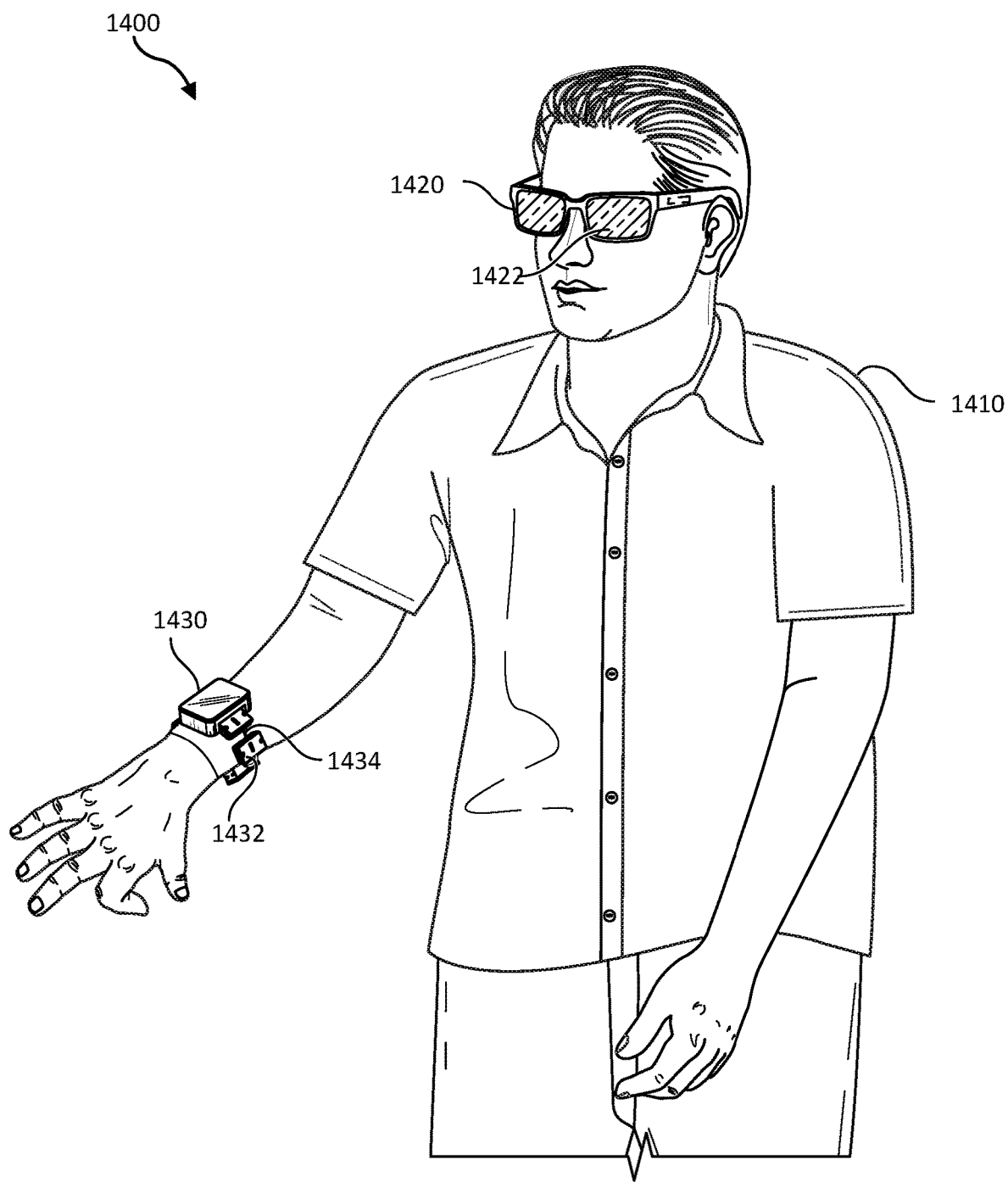
FIG. 14 is an illustration of an exemplary augmented-reality environment according to embodiments of this disclosure.

While haptic interfaces may be used with virtual-reality systems, as shown in FIG. 13, haptic interfaces may also be used with augmented-reality systems, as shown in FIG. 14. FIG. 14 is a perspective view a user 1410 interacting with an augmented-reality system 1400. In this example, user 1410 may wear a pair of augmented-reality glasses 1420 that have one or more displays 1422 and that are paired with a haptic device 1430. Haptic device 1430 may be a wristband that includes a plurality of band elements 1432 and a tensioning mechanism 1434 that connects band elements 1432 to one another.

One or more of band elements 1432 may include any type or form of actuator suitable for providing haptic feedback. For example, one or more of band elements 1432 may be configured to provide one or more of various types of cutaneous feedback, including vibration, force, traction, texture, and/or temperature. To provide such feedback, band elements 1432 may include one or more of various types of actuators. In one example, each of band elements 1432 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1210, 1220, 1304, and 1430 may include any suitable number and/or type of haptic transducer, sensor, and/or feedback mechanism. For example, haptic devices 1210, 1220, 1304, and 1430 may include one or more mechanical transducers, piezoelectric transducers, and/or fluidic transducers. Haptic devices 1210, 1220, 1304, and 1430 may also include various combinations of different types and forms of transducers that work together or independently to enhance a user's artificial-reality experience. In one example, each of band elements 1432 of haptic device 1430 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   communicatively coupling a user interface device to a virtual reality device;
   capturing inputs from a user on the user interface device;
   displaying, on the virtual reality device, a virtual representation of the user interface device based on stored parameters associated with the user interface device;
   displaying, on the virtual reality device, position indicators as an overlay on top of the virtual representation of the user interface device, wherein the position indicators indicate a position of an object as the object moves relative to the position of the user interface device;
   determining a position of the user interface device relative to the virtual reality device based on at least one distinguishable feature of the user interface device;
   displaying, on the virtual reality device, a virtual representation of the captured inputs from the user; and
   mirroring, on the virtual reality device, content presented on the user interface device.

2. The method of claim 1, wherein the virtual representation of the captured inputs from the user comprises tracking movements of at least one of:
   at least one hand of the user; or
   the user interface device.

3. The method of claim 2, wherein tracking movements comprises determining at least one of a location or an orientation of:
   the at least one hand of the user; or
   the user interface device.

4. The method of claim 3, wherein determining the at least one of the location or the orientation of the at least one hand of the user or the user interface device is based on at least one of:
   inertial measurement data transmitted from the user interface device to the virtual reality device;
   radar ranging data from a radar device on the virtual reality device; or
   image tracking data from an image sensor on the virtual reality device.

5. The method of claim 1, wherein capturing the inputs from the user on the user interface device comprises capturing images via an image sensor on the virtual reality device.

6. The method of claim 1, wherein the inputs from the user comprises at least one of a text input, a voice input, or a selection input.

7. The method of claim 1, wherein displaying, on the virtual reality device, a virtual representation of the captured inputs from the user comprises:
   capturing an image of the user interface device in a real-world environment;
   subtracting the image of the user interface device from a background of the real-world environment; and
   superimposing the subtracted image of the user interface device into a virtual environment of the virtual reality device.

8. The method of claim 1, wherein mirroring, on the virtual reality device, content presented on the user interface device comprises a wireless transmission of the content from the user interface device to the virtual reality device.

9. The method of claim 1, further comprising displaying, on the virtual reality device, animated content around the user interface device.

10. The method of claim 1, further comprising mirroring, on a virtual reality device associated with another user, the content presented on the user interface device.

11. The method of claim 1, wherein the captured inputs from the user on the user interface device function as controls for the virtual reality device.

12. The method of claim 1, wherein the user interface device is at least one of a smartphone, a keyboard, a display, a tablet device, or a remote controller.

13. A system comprising:
   a user interface device configured to communicate with a virtual reality device, wherein:
   the user interface device is configured to capture inputs from a user; and
   the virtual reality device is configured to:
      display, on the virtual reality device, a virtual representation of the user interface device based on stored parameters associated with the user interface device;
      display, on the virtual reality device, position indicators as an overlay on top of the virtual representation of the user interface device, wherein the position indicators indicate a position of an object as the object moves relative to the position of the user interface device;
      determine a position of the user interface device relative to the virtual reality device based on at least one distinguishable feature of the user interface device;
      display a virtual representation of the captured inputs from the user; and
      mirror content presented on the user interface device.

14. The system of claim 13, wherein the virtual representation of the captured inputs from the user comprises tracking movements of at least one of:
   at least one hand of the user; or
   the user interface device.

15. The system of claim 14, wherein tracking movements comprises determining at least one of a location or an orientation of:
   the at least one hand of the user; or
   the user interface device.

16. The system of claim 15, wherein determining the at least one of the location or the orientation of the at least one hand of the user or the user interface device is based on at least one of:
   inertial measurement data transmitted from the user interface device to the virtual reality device;
   radar ranging data from a radar device on the virtual reality device; or
   image tracking data from an image sensor on the virtual reality device.

17. The system of claim 13, wherein capturing the inputs from the user on the user interface device comprises capturing images via an image sensor on the virtual reality device.

18. A non-transitory computer-readable medium comprising:
- computer-readable instructions that, when executed by at least one processor of a computing device, cause the computing device to:
- communicatively couple a user interface device to a virtual reality device;
- capture inputs from a user on the user interface device;
- display, on the virtual reality device, a virtual representation of the user interface device based on stored parameters associated with the user interface device;
- display, on the virtual reality device, position indicators as an overlay on top of the virtual representation of the user interface device, wherein the position indicators indicate a position of an object as the object moves relative to the position of the user interface device;
- determine a position of the user interface device relative to the virtual reality device based on at least one distinguishable feature of the user interface device;
- display, on the virtual reality device, a virtual representation of the captured inputs from the user; and
- mirror content presented on the user interface device on the virtual reality device.

19. The method of claim 7, wherein a position of the subtracted image of the user interface device in the virtual environment corresponds to a location of the user interface device within the real-world environment.

\* \* \* \* \*